United States Patent Office 3,209,290
Patented Sept. 28, 1965

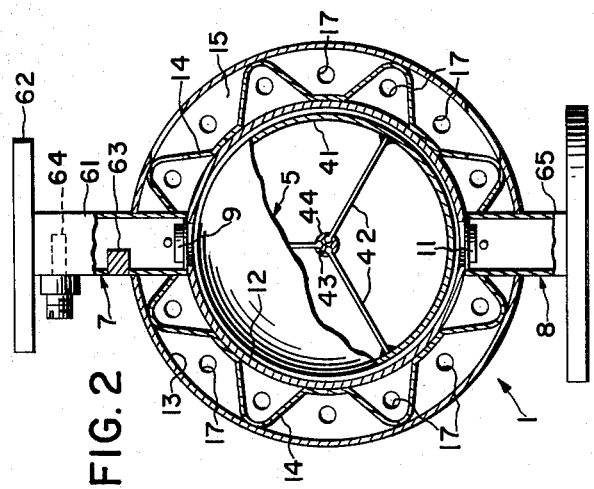

3,209,290
CAVITY RESONATOR HAVING SPACED WALLS WITH CORRUGATED REINFORCING MEANS
Vincent J. Grande, Palo Alto, Calif., assignor to Varian Associates, Palo Alto, Calif., a corporation of California
Filed Apr. 8, 1963, Ser. No. 271,440
7 Claims. (Cl. 333—83)

The present invention relates in general to cavity resonator apparatus and more specifically to a high Q tunable microwave cavity resonator useful, for example, as a stabilizing cavity for stabilizing the operating frequency of a reflex klystron oscillator, as a reference cavity in a frequency discriminator circuit, and the like.

Heretofore high Q tunable microwave cavity resonators have been built and used for stabilizing reflex klystron oscillators and as reference cavities for frequency discriminator circuits. Typically these devices have employed a relatively thick walled chamber for mechanical strength to prevent unwanted frequency modulation produced by vibration of the cavity frequency determinative parts. In addition the frequency determinative parts were made of a low thermal expansion material such as, for example, Invar (36% nickel and 64% iron) to prevent drift of the cavity's resonant frequency with temperature changes of the ambient environment. Such cavities generally are designed to operate in a circular electric dominant mode for high Q operation as of $Q=40,000$.

Such cavities are required to be stable in frequency to one part in 10,000 centered for example at 6 gc. over an ambient temperature range of 0° C. to 100° C. In addition, the cavity should be tunable over a 2% range with tuning resettability to $\pm 0.01\%$ or approximately $\pm 1$ mc. at 6 gc. Moreover the cavity and tuner mechanism should be nonresponsive to vibration.

A solid Invar cavity wall for a C band cavity yielding the aforementioned desired stability weighed approximately fifteen pounds. Movable end wall tuners with micrometer scales have given the aforementioned tuning range but the scales have been very difficult to read when resettability to $\pm 0.01\%$ is desired because this typically requires reading the micrometer scale accurately to four significant figures.

Micrometer type graduated scales have been used for reading the resonant frequency of the resonant cavities. However one problem of such devices is that when attempts are made to calibrate the scales to read changes of one ten-thousandth of an inch the scales become so crowded that a correct reading becomes difficult without magnification and the index marks become difficult to place on the tuner shaft.

In the present invention the cost of material and the weight of the cavity side wall structure has been reduced by a factor of four by making the side walls of the cavity of a sandwich construction in which a pair of spaced coaxial thin walled tubes are held together by a corrugated reinforcing structure sandwiched between the coaxial tubes. This sandwich construction provides a cavity structure comparable to that of a solid wall construction while reducing the weight and material cost by a factor of four.

In addition an expanded graduated micrometer scale has been provided on the tuner shaft by increasing the diameter of the graduated members and their scales and by inclining the axis of the scale on the tuner shaft relative to the plane of rotation of the scale coupled to the captured tuner drive nut. Inclining the axis, or line of development, of the shaft scale expands further the tuner micrometer scale permitting the scale to be readily read, without magnification, to one ten-thousandth of an inch.

The principal object of the present invention is to provide an improved microwave cavity resonator useful as a stabilizing cavity, as a reference cavity or the like.

One feature of the present invention is the provision of a cavity side wall sandwich type construction wherein a pair of thin walled tubular metallic members sandwich therebetween a corrugated metallic reinforcing structure to form a rigid, light weight, and economical cavity construction.

Another feature of the present invention is the provision of an expanded micrometer scale for reading the frequency of the tunable cavity resonator wherein the axis of the scale on the tuner shaft is inclined at an angle to the plane of rotation of the scale on the head to permit expansion of the graduated scale on the tuner shaft.

These and other features and advantages of the present invention will be more apparent after a perusal of the following specification taken in connection with the accompanying drawings wherein the same numeral is used in the various figures for the same or analogous element, and:

FIG. 1 is a longitudinal cross sectional view of a cavity resonator embodying the novel features of the present invention, FIG. 2 is a transverse cross sectional view of the structure of FIG. 1 taken along line 2—2 in the direction of the arrows, FIG. 3 is an enlarged fragmentary view of a portion of the structure of FIG. 1 delineated by line 3—3, FIG. 4 is a schematic drawing illustrating reading of the expanded micrometer scale feature of the present invention.

Referring now to FIGS. 1 and 2 there is shown in cross section a cavity resonator embodying the features of the present invention. A hollow metallic chamber 1 encloses a cylindrical resonant cavity chamber 2 defined by and bounded by the inner wall surfaces of a cylindrical side wall 3 and a pair of outwardly domed end walls 4 and 5, respectively. One end wall 5 is made movable axially of the cylindrical resonant chamber 2 for tuning thereof. A tuner actuating mechanism 6 mechanically interconnects to the movable wall 5 for effecting movement thereof and extends outwardly of the hollow chamber 1 from the upper end thereof.

A pair of port terminals 7 and 8 form the input and output terminals, respectively, of the cavity resonator 2 for applying wave energy to the cavity and for abstracting wave energy therefrom. When used as a reference cavity as opposed to use as a stabilizing cavity only a single port terminal may suffice for both an input and output terminal.

A pair of wave permeable gas tight R.F. window members 9 and 11 as of alumina ceramic are sealed across the input and output terminals. A metallic bellows or flexible partition as of stainless steel is sealed around the movable tuner actuating mechanism between the movable tuning mechanism and the inner wall of the chamber 1 for providing a flexible wall portion. The chamber 1 is evacuated in use to a low pressure as of $10^{-6}$ mm. Hg.

The cylindrical side wall 3 of the hollow chamber 1 is made of an integral composite sandwich construction. A pair of coaxially disposed spaced thin walled cylinders 12 and 13 as of 0.050" thick Invar form the inner and outer wall structure, respectively. In a typical example at C band the inner cylinder 12 has an inside diameter of 3.126" and the outer cylinder 13 has a diameter of 4.375". Both cylinders have a length of 7.682".

A corrugated reinforcing structure 14 is sandwiched between the inner and outer wall cylinders 12 and 13. The corrugated structure is formed by a plurality of longitudinally directed V-shaped cross section channels as of 0.050" thick Invar, closely fitted together around the outer periphery of the inner wall 12 to form the composite corrugated reinforcing structure. The ridges of the corrugations abut the inner surface of the outer cylinder 13 and are directed longitudinally of the chamber 1 parallel to the axis of revolution of the cavity resonator 2.

A pair of plate-like rings 15 and 16 as of Invar close off the annular space between cylinders 12 and 13 and are disposed at the opposite ends of the cylindrical wall 3. A plurality of peripherally spaced axially directed bores 17 pass through the rings 15 and 16 to permit free gas communication between the annulus between the walls 12 and 13 and the outside atmosphere. During manufacture of the composite sandwiched wall 3, the end rings 15 and 16, inner and outer cylinders 12 and 13, and the corrugated reinforcing structure 14 are all brazed together in a furnace at elevated temperature. The bores 17 prevent setting up of excessive gas pressure in the annulus of the wall 3 which might otherwise explode the wall because of trapping of gas therein.

The composite wall 3 forms a rigid, lightweight structure performing electrically and mechanically in every way as well as prior solid Invar walls. This construction reduces the weight of a typical C band cavity wall 3 with terminals 7 and 8 from 15 pounds to 4 pounds and also effects a considerable economy in material cost.

The tuner assembly 6 is disposed at the one end of the chamber 1 and serves to move the outwardly domed tuning wall 5 axially of the cavity resonator 2. The movable wall 5 is formed by a hollow tubular member of relatively thin walled construction as of 0.050" wall thickness Invar.

A hollow tubular shaft 18 as of stainless steel is vacuum sealed at its inner end to the margin of a centrally disposed opening in a back wall 19 as of Invar of the hollow movable wall 5. The shaft 18 extends outwardly of the chamber 1 and is provided with external threads midway of its length at 21 (see FIG. 3). A radially directed flange 22 of the shaft 18 is vacuum sealed as by brazing to the bellows 10 which in turn is sealed to the inside wall 12 of the chamber 1 via the intermediary of an inwardly domed wall 23 as of 0.050" thick Invar. Thus the vacuum envelope of the chamber 1 is completed through the intermediaries of walls 12, 23, bellows 10, shaft 18, and walls of the hollow movable tuning wall 5.

A nut 24 as of stainless steel is threaded over the threaded portion 21 of the hollow shaft 18. A centrally apertured end plate 25 as of stainless steel is bolted to the end of the chamber 1. The nut 24 is captured on the shaft 18 by bearing against the end plate 25 on its innermost face and by the spring biasing force exerted on the nut 24 through the intermediary of the threads 21 as derived from the air pressure operating upon the inside of the hollow tuning wall 5 tending to axially collapse the bellows 10 against the vacuum pressure inside the cavity resonator 2. The shaft 18 is captured against rotation by the bellows 10 and wall 23.

Rotation of the nut 24 causes the hollow shaft 18 and the mechanically interdependently linked movable tuning wall 5 to move axially of the resonant chamber 2 for tuning thereof.

A pair of cooperative micrometer-like graduated scales, one carried from the nut 24 and the other carried from the shaft 18, serve to measure the degree of penetration of the movable wall 5 into the chamber 1 and therefore serves as a measure of the resonant frequency of the cavity resonator 2. A calibration chart (not shown) is used to convert scale readings to frequency.

The rotating graduated scale is inscribed upon the exterior surface of an inwardly directed lip portion 26 as of aluminum of a composite cup member 27. The cup 27 is fixedly secured as by brazing to the nut 24 at the margin of a central opening in the bottom 28 of the cup 27, which margin abuts a collar 29 of the nut 24. The exterior side wall of the cup 27 is knurled at 31 for ease of gripping and turning. The rotatable graduated scale is directed in a line of development around the lip 26 of the cup 27 in the transverse plane of rotation of the nut 24. The scale is marked in graduations of 0–19 around the lip as seen also in FIG. 4.

The other non-rotatable scale is inscribed upon the exterior surface of a hollow cylindrical hub member 32 as of aluminum. The hub is mechanically interdependently linked to and moves axially with the shaft 18. The mechanical connection between the hub 32 and the shaft 18 is made via the intermediary of fixedly connected ring 33 and threaded sleeve 34 as of stainless steel. The sleeve 34 is in turn keyed to the shaft 18 via key 35.

The shaft carried graduated scale is laid out along a line of development inclined at an acute angle $\theta$ to the plane of rotation of the rotatable scale (see FIG. 4). The inclined scale increases the space between graduations of the non-rotatable scale as compared to the space between similar graduations if they were inscribed with a vertically directed line of development, as has been customary heretofore when using micrometer-like scales. For example the space between graduations on the inclined scale may be doubled if the angle $\theta$ is equal to 30°.

The scale is read by adding the reading of the rotatable scale, at the point of scale intersection, to the next lowest significant graduation on the inclined scale. For example, the total reading, as exemplified in FIG. 4, is 194.6 obtained by adding 180.0 from the inclined scale to 14.6 of the rotatable scale. In a preferred embodiment the threads on the nut 24 and shaft 18 are chosen to yield 0.020" axial travel of the shaft 18 for each revolution of the nut 24. Hence 0.020" corresponds to the axial distance between the smallest graduations of the inclined scale. The graduations on the rotatable scale then correspond to 0.001" and can be interpolated to 0.0001".

In the case of a typical C band cavity resonator, with scales laid out as aforementioned, the frequency is readable without magnification to ±35 kc. with the inclined scale extending over a quarter of the periphery around the hub 32. Two tuner locking mechanisms are provided for locking the movable tuning wall 5 in position against inadvertent movement via nut 24 and against movement under environments of shock and vibration.

A first tuner lock operates upon the side wall 41 of the hollow tuning wall 5 to selectively forceably bow the tuner side wall 41 outwardly against the adjacent inner surface of the inner cylindrical cavity side wall 12 to provide a friction lock for the hollow movable wall 5.

More specifically, a plurality of vane-like spokes 42 as of 0.050" thick Invar are brazed at their outer ends to the inside surface of tuner side wall 41. The inner ends of the radially directed spokes 42 each ride within axially directed cam slots 43 in a cam shaft 44 as of stainless steel. The cam shaft 44 extends axially outwardly of the chamber 1 coaxially of and through the hollow interior of the tuner shaft 18.

A knurled nut 45 as of stainless steel is fixedly secured to the cam shaft 44 as by being pinned thereto. The nut serves as a knob for tuning the cam shaft 44 causing the outer ends of the spoke 42 to move radially outwardly of the movable tuning wall 5 as the cam slots revolve into angular registry with the outer ends of the spokes 42.

Outward movement of the spoke outer ends radially expands as of 0.005" the movable tuner wall 41 against the closely spaced as of 0.003" cavity wall 12 forming a rigid frictional lock. This first locking mechanism is so non-microphonic that R.M.S. frequency deviation of the cavity produced by a vibrational environment in the worst orientation of 1g between 5 c.p.s. and 33 c.p.s. is less than 200 R.M.S. c.p.s. at C band. This tuner lock structure forms the subject matter of and is claimed in a copending application, U.S. Serial No. 271,442 filed April 8, 1963 and assigned to the same assignee as the present invention.

The second tuner locking mechanism serves to lock the actuating nut 24 against inadvertent movement thereof by selectively producing a high frictional load on the threads of the nut 24. More specifically, the nut 24 is provided with a central recess in its internal threads dividing the threads into two axially spaced threaded regions 51 and 52, respectively. The outer region 52 threadably mates with the external threads on the sleeve 34.

The knurled nut 45 affixed to the end of the cam shaft 44 also threadably mates with the threads of the sleeve 34. Rotation of the nut 45 to lock the tuner wall 5 also causes the nut 45 to travel down the tuner shaft 18 until the internal shoulder of the nut at 53 engages the end of the tuner shaft 44 thereby stopping axial movement of the nut 45. Further rotation of the nut pulls the sleeve 34 toward the shoulder 53 thereby frictionally loading the threads 51 and 52 of the nut 24 producing a frictional lock thereof. In a preferred embodiment the parts are dimensioned such that a quarter turn of the nut 45 performs both of the aforementioned shaft and tuning wall locking functions.

The fixed end wall 4 as of Invar of the resonator chamber 2 is vacuum sealed at the outer periphery of its frustro conical stainless steel collar to the inside wall 12 of the chamber 1 as by Heliarc welding. A cover plate 55 is affixed over the end wall 4 by screws 56 inserted through the plate into tapped holes in the end ring 16. The outer periphery of the cover plate 55 is threaded to receive a threaded collar 57 for also threadably mating with a cavity holding fixture, not shown, to readily permit adjustment in the height of the port terminals 7 and 8 with respect to the holding fixture.

The input terminal 7 includes a hollow rectangular waveguide 61 as of Invar disposed in registry with the input R.F. window 9. An input flange 62 as of copper connects to a reflex klystron oscillator, not shown. A pair of capacitive phase adjusting posts 63 and 64 are provided extending into the input waveguide 61 from the broad wall thereof. The posts 63 and 64 adjust the effective electrical length of the guide between the cavity resonator 2 and the reflex klystron for impedance matching. One of the posts 64 is made adjustable and in a preferred embodiment is formed by a stainless steel screw threaded into the guide 61.

The input guide 61 is turned such that the electric field vector of the wave energy in the guide 61 is in alignment, at the input iris, with the electric field of the $TE_{0,1,3}$ mode within the cavity resonator 2 such that this mode will be excited.

The output terminal 8 includes an output rectangular waveguide 65 disposed in registry with the output R.F. window 11 and with the electric field vector of the guide in alignment with the electric field of the $TE_{0,1,3}$ mode for abstracting energy from this mode for propagation to a suitable load, not shown.

A typical C band stabilization cavity resonator constructed as called for above is tunable over a 150 mc. range; provides an unloaded Q of 40,000 with a stability ratio of 30 with a 5 db insertion loss; is retunable to within ±50 kc.; and under vibration with a reflex klystron connected for stabilization its FM noise in a 100 cycle band is less than 1 cycle R.M.S. deviation at modulation frequencies from 1 kc. to 100 kc.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A microwave high Q stabilizing cavity resonator apparatus including; a hollow highly electrically conductive chamber defining the boundary wall of a high Q cavity resonator adapted and arranged to support a dominant high Q circular electric mode of oscillation therein; a cylindrical side wall of said chamber comprising, a first cylindrical wall member defining an inner cylindrical boundary side wall of said cavity resonator, a second cylindrical wall member surrounding said first wall member and being outwardly spaced apart from said first wall member, and a corrugated reinforcing structure fixedly secured in between said first and second wall members reinforcing same to provide a rigid, light weight, composite cylindrical side wall structure for said metallic chamber, and means for exciting the circular electric mode of oscillation in and for abstracting microwave energy from the circular electric mode in said hollow chamber.

2. The cavity resonator apparatus according to claim 1 wherein said corrugated reinforcing structure is disposed with the ridges of the corrugated structure directed substantially parallel to the axis of revolution of the cylindrical chamber wall.

3. The cavity apparatus according to claim 2 including a pair of members disposed at opposite ends of said first and second cylindrical walls closing off an annular space between said first and second walls, and said pair of members being perforated at spaced intervals in registry with the annular space for gas communication between the annular space and the outside of said chamber to prevent setting up of excessive gas pressure in the annular space during heating of the chamber as encountered during the manufacture thereof.

4. The cavity resonator according to claim 2 including a pair of axially spaced apart walls defining the end boundary walls of the cylindrical resonant chamber, and one of said end walls being movable axially of said cylindrical resonant chamber for tuning thereof.

5. The cavity apparatus of claim 4 including, means for translating said movable end wall, said translating means extending outwardly of said resonant chamber, and micrometer means for measuring the relative position of said movable end wall within said resonant chamber, and said micrometer means including, a first graduated scale interdependently mechanically linked with and movable with said movable end wall, and a second graduated scale revolvable around said first scale and the intersection of said first and second scales giving a reading determinative of the position of said movable end wall within said resonant chamber, and said first scale having a line of development being inclined at an acute angle to the plane of revolution of said second scale whereby the dimensions of said first scale may be enlarged as opposed to a first scale extending normal to said second scale.

6. The cavity apparatus according to claim 5 wherein said first scale is inclined at an angle of less than 45° with respect to the plane of revolution of said second scale.

7. The cavity apparatus according to claim 4 wherein said resonant chamber is vacuum sealed and evacuated, and wherein the inner surface of said movable end wall is of outwardly domed shape to detune certain unwanted $TE_{1,1,n}$ modes, and a flexible thin walled metallic partition vacuum sealed between said movable end wall and a wall of said metallic chamber to permit substantial movement of said movable wall without destroying the vacuum integrity of said evacuated resonant chamber.

References Cited by the Examiner
UNITED STATES PATENTS

| | | | |
|---|---|---|---|
| 2,373,270 | 4/45 | Skolnik | 220—71 |
| 2,405,612 | 8/46 | Schelkunoff | 333—83 |
| 2,487,619 | 11/49 | Usselman | 333—83 |
| 2,503,256 | 4/50 | Ginzton et al. | 333—83 |
| 2,520,022 | 8/50 | Vobeda | 33—170 |
| 2,527,946 | 10/50 | Linder | 333—83 |
| 2,952,077 | 9/60 | Burgess et al. | 33—170 |
| 3,066,822 | 12/62 | Watter | 220—15 |

HERMAN KARL SAALBACH, *Primary Examiner.*